US012667933B2

(12) United States Patent
Liu et al.

(10) Patent No.: US 12,667,933 B2
(45) Date of Patent: Jun. 30, 2026

(54) EVOLUTIONARY COMPENSATION METHOD FOR SPINDLE ROTATION ERROR OF COMPUTER NUMERICAL CONTROL GRINDING MACHINE BASED ON TIMING IN-SITU MEASUREMENT

(71) Applicant: Zhejiang University, Hangzhou (CN)

(72) Inventors: Zhenyu Liu, Hangzhou (CN); Guodong Sa, Hangzhou (CN); Jiacheng Sun, Hangzhou (CN); Chan Qiu, Hangzhou (CN); Zhengyang Jiang, Hangzhou (CN); Jianrong Tan, Hangzhou (CN)

(73) Assignee: Zhejiang University, Hangzhou (CN)

( * ) Notice: Subject to any disclaimer, the term of this patent is extended or adjusted under 35 U.S.C. 154(b) by 311 days.

(21) Appl. No.: 18/628,615

(22) Filed: Apr. 16, 2024

(65) Prior Publication Data

US 2024/0399537 A1 Dec. 5, 2024

Related U.S. Application Data

(63) Continuation-in-part of application No. PCT/CN2023/139878, filed on Dec. 19, 2023.

(30) Foreign Application Priority Data

Jun. 1, 2023 (CN) .......................... 202310640942.5

(51) Int. Cl.
B24B 49/12 (2006.01)
B24B 41/00 (2006.01)
G05B 19/414 (2006.01)
G06T 7/00 (2017.01)
G06T 7/73 (2017.01)
G06T 7/80 (2017.01)

(52) U.S. Cl.
CPC ............ *B24B 49/12* (2013.01); *B24B 41/007* (2013.01); *G05B 19/4145* (2013.01);
(Continued)

(58) Field of Classification Search
CPC ....... B24B 49/12; B24B 49/02; B24B 41/007; B24B 49/10; G06T 7/80; G06T 7/73;
(Continued)

(56) References Cited

U.S. PATENT DOCUMENTS 4,709,509 A * 12/1987 Yoneda .................. B23Q 15/14
451/8
5,205,078 A * 4/1993 Takara .................. F16C 32/044
451/294

(Continued)

*Primary Examiner* — Omar Flores Sanchez
(74) *Attorney, Agent, or Firm* — CM Law LLP; Robert C. Klinger

(57) ABSTRACT

An evolutionary compensation method for a spindle rotation error of a CNC grinding machine is provided. Feature points are determined at an edge of a central hole of a spindle of a CNC grinding machine, and a spindle rotation error in-situ measuring device is fixed on the grinding machine and aligned with the edge of the central hole; a trajectory image of the feature points is acquired by using the measuring device; a measured value of the spindle rotation error is obtained according to the trajectory image; features of the spindle rotation error are fused with the measured value of the spindle rotation error, a spindle rotation error compensation model is established, to output a spindle rotation error compensation value, thereby compensating the spindle rotation error. By continuously calibrating the error model using the measured value, accuracy of the error model has been continuously optimized.

8 Claims, 4 Drawing Sheets

(52) U.S. Cl.
CPC .............. *G06T 7/0004* (2013.01); *G06T 7/73* (2017.01); *G06T 7/80* (2017.01); *G05B 2219/45161* (2013.01); *G06T 2207/20221* (2013.01); *G06T 2207/30241* (2013.01)

(58) Field of Classification Search
CPC ......... G06T 7/0004; G06T 2207/20221; G06T 2207/30241; G05B 19/4145; G05B 2219/45161; G05B 19/4015
USPC .......................................................... 700/174
See application file for complete search history.

(56) References Cited

U.S. PATENT DOCUMENTS

| | | | | | |
|---|---|---|---|---|---|
| 6,443,818 | B1 * | 9/2002 | Bent | ................... | B24B 27/0053 |
| | | | | | 451/6 |
| 7,595,602 | B2 * | 9/2009 | Xu | ..................... | G05B 19/4163 |
| | | | | | 700/173 |
| 8,786,243 | B2 * | 7/2014 | Mori | ...................... | B23Q 17/22 |
| | | | | | 318/632 |
| 9,002,502 | B2 * | 4/2015 | Matsushita | .......... | B23Q 1/4857 |
| | | | | | 700/193 |
| 10,088,826 | B2 * | 10/2018 | Jalluri | .................. | G05B 19/404 |
| 2012/0033228 | A1 * | 2/2012 | Tschudi | ............. | G01B 11/2441 |
| | | | | | 356/511 |
| 2014/0134923 | A1 * | 5/2014 | Brake | ..................... | B24B 49/02 |
| | | | | | 451/41 |
| 2016/0033955 | A1 * | 2/2016 | Satake | ............... | G05B 23/0272 |
| | | | | | 700/174 |
| 2018/0079044 | A1 * | 3/2018 | Mototani | ............... | B23Q 15/22 |
| 2018/0238419 | A1 * | 8/2018 | Glaser | ................ | B23F 23/1237 |
| 2024/0025012 | A1 * | 1/2024 | Wurm | ................. | H03M 1/1205 |
| 2025/0235976 | A1 * | 7/2025 | Franzmann | ............ | G01M 11/31 |
| 2025/0271249 | A1 * | 8/2025 | Katsuoka | ............... | G01B 21/04 |
| 2025/0276421 | A1 * | 9/2025 | Li | .................... | G05B 19/41875 |

* cited by examiner 71        72        73        74

EVOLUTIONARY COMPENSATION METHOD FOR SPINDLE ROTATION ERROR OF COMPUTER NUMERICAL CONTROL GRINDING MACHINE BASED ON TIMING IN-SITU MEASUREMENT

CROSS-REFERENCE TO RELATED APPLICATION

This patent application is a continuation-in-part of International Application No. PCT/CN2023/139878, filed on Dec. 19, 2023, which claims the benefit and priority of Chinese Patent Application No. 202310640942.5 filed with the China National Intellectual Property Administration on Jun. 1, 2023. Both of the aforementioned applications are incorporated by reference herein in their entireties as part of the present application.

TECHNICAL FIELD

The present disclosure relates to a compensation method for a spindle rotation error of a computer numerical control grinding machine, in particular to an evolutionary compensation method for a spindle rotation error of a computer numerical control grinding machine based on timing in-situ measurement.

BACKGROUND

Precision parts are widely used in aviation, aerospace, national defense and other fields. Computer numerical control (CNC) grinding machines provide a strong guarantee for high-precision and high-quality processing of such parts. As a core functional component of the CNC grinding machine, a spindle unit directly affects the machining quality of machined parts. For a long time, domestic CNC machine tool manufacturers usually use the static rotation accuracy of machine tools at the factory as a measurement index of the spindle rotation accuracy. However, with the continuous improvement of the manufacturing level, CNC grinding machines are mostly used for precision and ultra-precision machining. An extremely weak rotation error of the spindle of the grinding machine may have a serious impact on the machining accuracy, and it is difficult to guarantee the machining quality of parts only by compensating the static rotation error. Therefore, it is greatly significant to compensate for rotation errors accurately according to the measurement results of the dynamic rotation accuracy of the spindle to ensure the machining accuracy of the CNC grinding machine.

Error compensation methods are mainly divided into the feedback interruption method and the coordinate origin offset method (referring to "A review on spindle thermal error compensation in machine tools"; Yang Li, Wanhua Zhao, Shuhuai Lan, Jun Ni, Wenwu Wu, Bingheng Lu; Published in: International Journal of Machine Tools and Manufacture (Volume 95, August 2015, Pages 20-38)) based on their principles. In the coordinate origin offset method, compensation is achieved by using the external mechanical coordinate system origin translation function of the CNC system after a compensation amount is input to the CNC controller through the I/O interface.

The existing methods for measuring the dynamic rotation error of the spindle of the CNC grinding machine mainly include the following methods.

(1) A displacement sensor measuring method: a standard workpiece is clamped on the spindle of the grinding machine, a plurality of displacement sensors are arranged in the axial direction and radial direction of the spindle to measure the rotation error of the spindle indirectly, and the rotation error is determined by a roundness error separation technique. There are some problems in this method, such as difficulty in separating roundness errors and ensuring accuracy, and difficulty in arranging displacement sensors.

(2) A machine vision measuring method: the trajectory image of the feature points during the rotation of the spindle of the CNC grinding machine are acquired and processed, and the spindle rotation error is analyzed and determined. There are some problems in this method, such as inability in in-machine compensation, complex processing of the trajectory image of feature points, and significant lag of measurement results.

In the actual machining process of the CNC grinding machine, factors such as spindle speed, load, working conditions, lubrication, and thermal deformation will affect the spindle rotation accuracy. The real-time in-situ measurement of a rotation error provides data support for the compensation process, which has an important influence on the spindle rotation accuracy and even the machining accuracy of the CNC grinding machine. The existing research methods cannot realize the compensation for axial and radial rotation errors of the spindle of the CNC grinding machine based on real-time in-situ measurement.

SUMMARY

In order to solve the problems existing in the background, the present disclosure provides an evolutionary compensation method for a spindle rotation error of a CNC grinding machine based on timing in-situ measurement, which is used to realize timing in-situ compensation for axial and radial rotation errors of the spindle of the CNC grinding machine. The present disclosure can overcome the shortcomings of the existing methods. During the operation of the CNC grinding machine, the spindle rotation error is determined by a spindle rotation error in-situ measuring device of the CNC grinding machine, and the spindle rotation error compensation model of the CNC grinding machine is established by fusing with features of the spindle rotation error, thus making up for the measurement lag problem of the measuring device. The measurement process is repeated every m minutes, the compensation model is continuously improved and optimized, the compensation value of the rotation error is determined based on timing in-situ measurement, and the compensation accuracy of the spindle rotation error of the CNC grinding machine is improved.

In order to achieve the above purpose, the technical scheme of the present disclosure is as follows:

S1, fixing a spindle rotation error in-situ measuring device of the CNC grinding machine on the CNC grinding machine, determining a plurality of feature points at an edge of a central hole of a spindle, and aligning the spindle rotation error in-situ measuring device of the CNC grinding machine with the edge of the central hole of the spindle;

S2, when the CNC grinding machine is in an operating state, acquiring a trajectory image of the feature points at the edge of the central hole of the spindle by using the spindle rotation error in-situ measuring device of the CNC grinding machine;

S3, obtaining a measured value of the spindle rotation error by calculation according to the trajectory image of the feature points at the edge of the central hole of the spindle;

S4, fusing features of the spindle rotation error of the CNC grinding machine with the measured value of the spindle rotation error; establishing a spindle rotation error compensation model of the CNC grinding machine, by which a spindle rotation error compensation value is output; and compensating the spindle rotation error of the CNC grinding machine according to the spindle rotation error compensation value;

S5, repeating S2-S3, obtaining the measured value of the spindle rotation error by calculation, calibrating the spindle rotation error compensation model of the CNC grinding machine at current time by using a current measured value of the spindle rotation error and updating the spindle rotation error compensation model, and obtaining a latest spindle rotation error compensation value;

S6: repeating S5, and constantly calibrating and updating the spindle rotation error compensation model of the CNC grinding machine, so as to realize continuous optimization and compensation of the spindle rotation error of the CNC grinding machine.

Compared with the prior art, the present disclosure has the following beneficial effects.

1) The spindle rotation error measuring device of the CNC grinding machine in the present disclosure is not affected by the internal structure arrangement of the grinding machine and is installed simply, and the axial and radial rotation errors of the spindle of the CNC grinding machine can be simultaneously obtained.

2) The measurement result of the spindle rotation error in the present disclosure include no spindle roundness error, and the measurement accuracy of is high.

3) The evolution compensation model for the spindle rotation error of the CNC grinding machine established by the present disclosure meets the real-time requirement of rotation error compensation, the compensation ability is continuously improved and optimized, and the rotation error compensation accuracy is high.

BRIEF DESCRIPTION OF THE DRAWINGS

In order to explain the technical scheme in the embodiment of the present disclosure more clearly, the drawings needed in the description of the embodiment will be briefly introduced hereinafter. Obviously, the drawings described below are only some embodiments of the present disclosure. Other drawings can be obtained according to these drawings without creative labor for those skilled in the art.

4

DESCRIPTION OF REFERENCE NUMERALS

Figure 1:
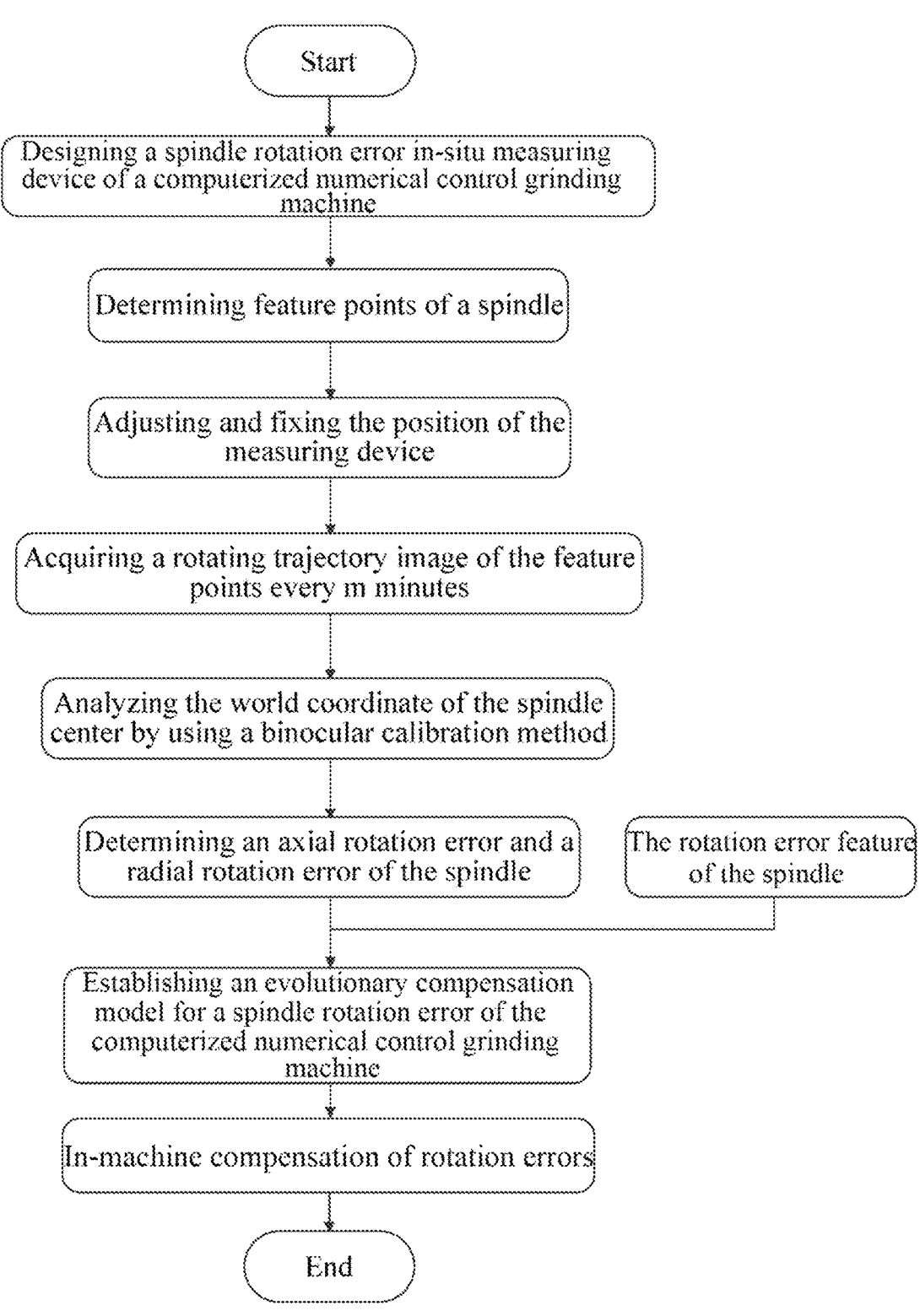
FIG. 1 is a flowchart of the method according to the present disclosure.

Vertical guide rail frame 1, horizontal guide rail 2, slider 3, front and rear guide rails 4, sliding table 5, pitching guide rail 6, calibration light source 7, right camera vertical moving guide rail 8, right industrial camera 9, right camera rotating table 10, left camera vertical moving guide rail 11, left industrial camera 12, left camera rotating table 13, rotary aperture adjusting ring 71, silicon-based target slice 72, support 73, LED light source 74.

DETAILED DESCRIPTION OF THE EMBODIMENTS

The technical schemes in the embodiments of the present disclosure will be clearly and completely described with reference to the accompanying drawings in the embodiments of the present disclosure hereinafter. Obviously, the described embodiments are only some embodiments of the present disclosure, rather than all of the embodiments. Based on the embodiment of the present disclosure, all other embodiments obtained by those skilled in the art without creative labor belong to the scope of protection of the present disclosure.

In order to make the above objects, features and advantages of the present disclosure more obvious and understandable, the present disclosure will be explained in further detail with reference to the drawings and detailed description hereinafter.

Figure 2:
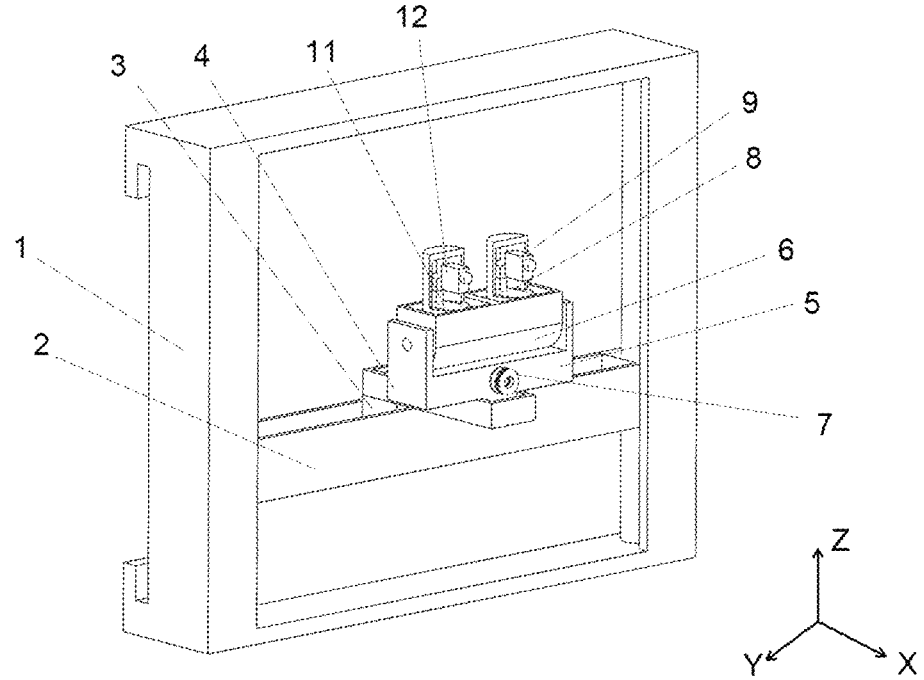
FIG. 2 is a schematic diagram of the overall structure of a spindle rotation error in-situ measuring device of a CNC grinding machine.
Figure 3:
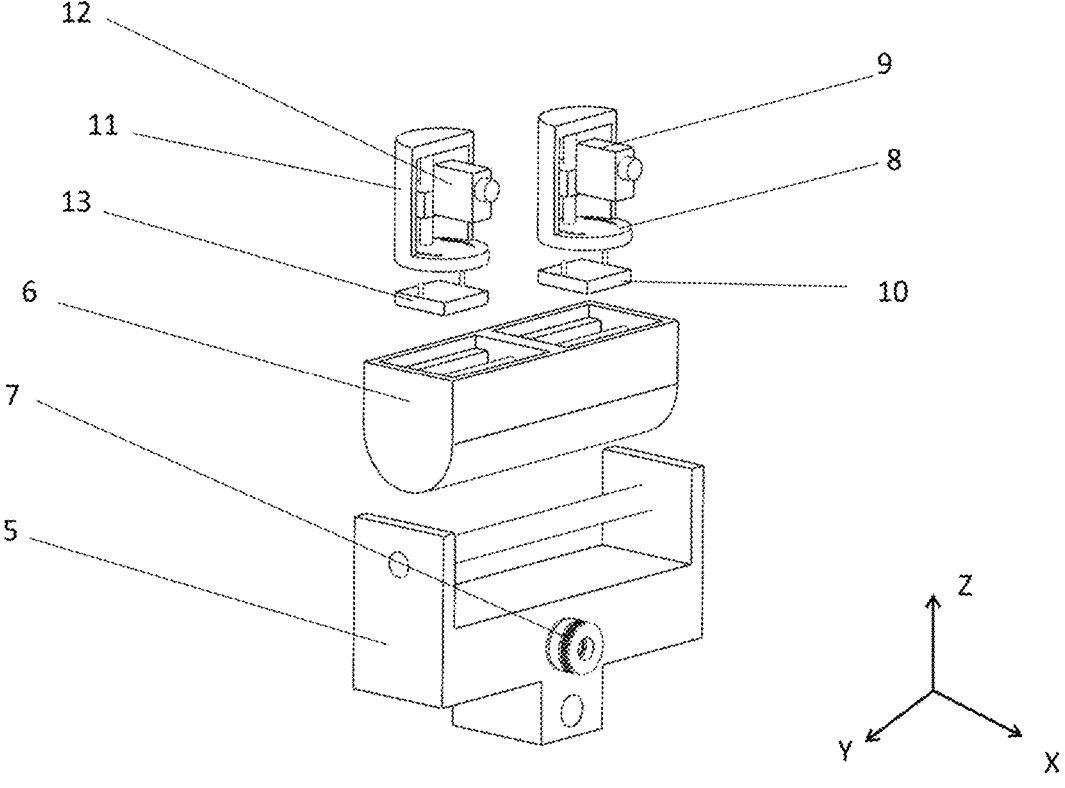
FIG. 3 is an exploded schematic diagram of the structure of the spindle rotation error in-situ measuring device of the CNC grinding machine.

In specific implementation, as shown in FIG. 2 and FIG. 3, the spindle rotation error in-situ measuring device of the CNC grinding machine includes a vertical guide rail frame 1, a horizontal guide rail 2, a slider 3, front and rear guide rails 4, a sliding table 5, a pitching guide rail 6, a calibration light source 7, a left camera assembly and a right camera assembly.

The vertical guide rail frame 1 is fixedly installed in the moving door of the CNC grinding machine through a chute structure behind the vertical guide rail frame. The horizontal guide rail 2 is installed in the vertical guide rail frame 1 through the slider 3. The horizontal guide rail 2 slides up and down in the vertical guide rail frame 1. The front and rear guide rails 4 are installed on the horizontal guide rail 2 through the slider 3. The front and rear guide rails 4 slide horizontally in the horizontal guide rail 2. The sliding table 5 is installed on the front and rear guide rails 4, and the sliding table 5 slides forward and backward in the front and rear guide rails 4. The calibration light source 7 is fixedly installed on a side surface of the sliding table 5. The pitching guide rail 6 is installed on the sliding table 5. The left camera assembly and the right camera assembly are installed in the pitching guide rail 6, and the left camera assembly and the right camera assembly are arranged at an interval.

The right camera assembly includes a right camera vertical moving guide rail 8, a right industrial camera 9 and a right camera rotating table 10. The right camera rotating table 10 is installed in the sliding table 5. The right camera vertical moving guide rail 8 is fixedly installed on the right camera rotating table 10. The right industrial camera 9 is installed on a side surface of the right camera vertical moving guide rail 8. The right industrial camera 9 has a displacement degree of freedom in Y and Z directions and a rotation degree of freedom in Z axis relative to the pitching guide rail 6, and the right industrial camera 9 has a displacement degree of freedom in Y direction relative to the left industrial camera 12.

The left camera assembly includes a left camera vertical moving guide rail 11, a left industrial camera 12 and a left camera rotating table 13. The left camera rotating table 13 is installed in the sliding table 5. The left camera vertical moving guide rail 11 is fixedly installed on the left camera rotating table 13. The left industrial camera 12 is installed on a side surface of the left camera vertical moving guide rail 11. The left industrial camera 12 has a displacement degree of freedom in Y and Z directions and a rotation degree of freedom in Z axis relative to the pitching guide rail 6.

Figure 4:
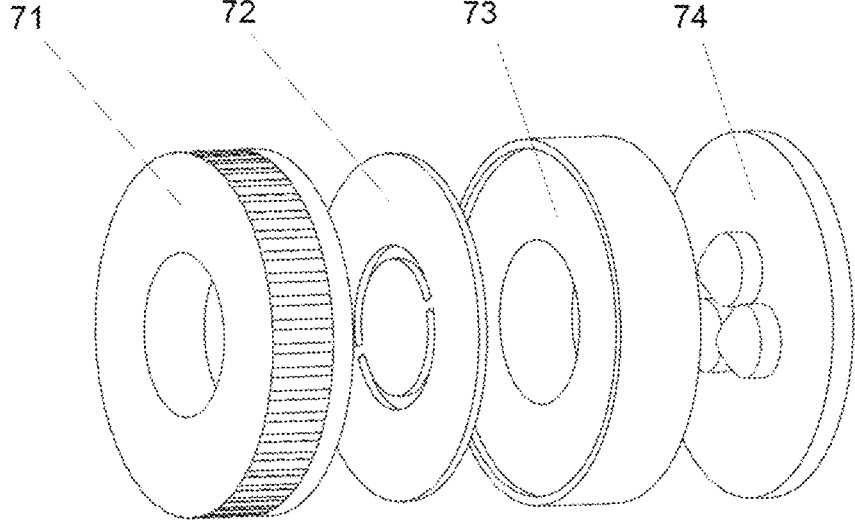
FIG. 4 is an exploded schematic diagram of the structure of a calibration light source in the spindle rotation error in-situ measuring device of the CNC grinding machine.

As shown in FIG. 4, the calibration light source 7 includes a rotary aperture adjusting ring 71, a silicon-based target slice 72, a support 73 and an LED light source 74.

The support 73 is fixedly installed on the LED light source 74. The rotary aperture adjusting ring 71 is installed on the support 73. The silicon-based target slice 72 is installed between the rotary aperture adjusting ring 71 and the support 73. The middle of the support 73 is provided with a through hole. The middle of the silicon-based target slice 72 is provided with a light-transmitting ring hole. A light beam emitted by the LED light source 74 passes through the through hole of the support 73 and the light-transmitting ring hole in sequence and then exits from the rotary aperture adjusting ring 71. The outgoing light beam is aligned with the edge of the central hole of the spindle, wherein the rotary aperture adjusting ring 71 is used to adjust the intensity of the outgoing light beam.

As shown in FIG. 1, a grinding machine of the embodiment of the present disclosure is illustrated as an example, including the following steps S1 to S6.

Figure 5:
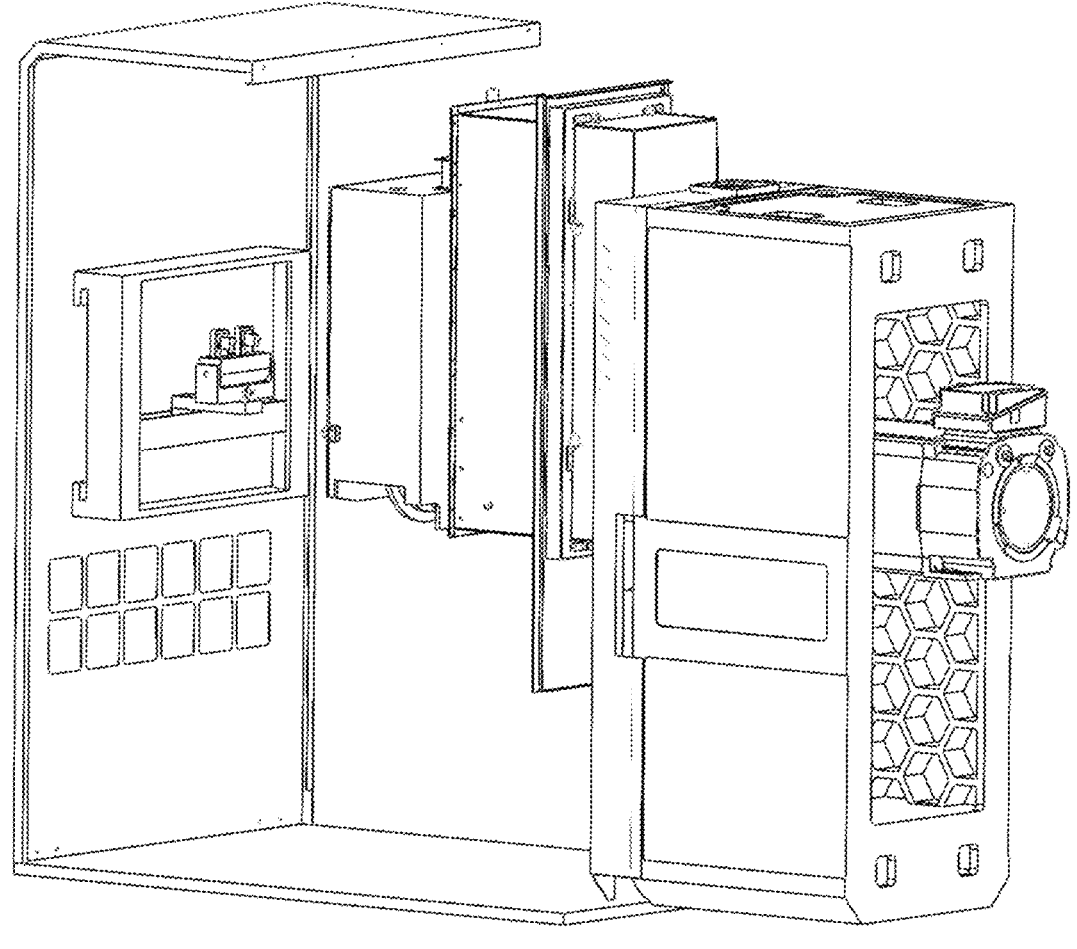
FIG. 5 is an in-machine schematic diagram of the spindle rotation error in-situ measuring device of the CNC grinding machine.

In step S1, as shown in FIG. 5, a spindle rotation error in-situ measuring device of a CNC grinding machine is fixed on the CNC grinding machine, a plurality of feature points are determined at an edge of a central hole of the spindle, and the calibration light source 7 of the spindle rotation error in-situ measuring device of the CNC grinding machine is aligned with the edge of the central hole of the spindle. The sizes of the feature points are set to 5 μm to 20 μm. In the specific implementation, three feature points with a size of 10 μm are provided.

In step S2, the CNC grinding machine starts, and when the CNC grinding machine is in operating state, a trajectory image of the feature points at the edge of the central hole of the spindle is acquired by using the spindle rotation error in-situ measuring device of the CNC grinding machine.

In S2, camera shutter time of the spindle rotation error in-situ measuring device of the CNC grinding machine is a same as a spindle rotation period, trajectories of the feature points at the edge of the central hole of the spindle rotating with the spindle for N cycles is acquired every m minutes to obtain an initial feature point image, and a trajectory image of the feature points at the edge of the central hole of the spindle is obtained after image enhancement and edge extraction of the initial feature point image. The selection of m is related to the actual machining conditions, and m is usually taken as 10. The value of N is related to the spindle speed n, usually N=2n. Image enhancement and edge extraction are carried out on the initial feature point image. Specifically, the trajectories of all the feature points at the edge of the central hole of the spindle in the initial feature point image rotating with the spindle are processed circle by circle, the contrast of the original image is increased by image enhancement means, and the edge extraction is carried out by a Canny operator to obtain the trajectory coordinate set of the feature points.

In step S3, a measured value of the spindle rotation error is calculated and obtained according to the trajectory image of the feature points at the edge of the central hole of the spindle.

Step S3 specifically includes:

according to the trajectory image of the feature points at the edge of the central hole of the spindle acquired by the right industrial camera 9 and the left industrial camera 12 respectively, determining spindle center coordinates of the spindle in camera coordinate systems corresponding to the right industrial camera 9 and the left industrial camera 12 respectively, fusing and analyzing the spindle center coordinates of the spindle in the two camera coordinate systems by using a binocular calibration method to obtain a world coordinate of a spindle center of the CNC grinding machine, finally determining an axial rotation error and a radial rotation error of the spindle according to the world coordinate of the spindle center of the CNC grinding machine, and denoting the axial rotation error and the radial rotation error as the measured value of the spindle rotation error.

Specifically:

according to the trajectory coordinate of each feature point at the edge of the central hole acquired in S2, the goal is to minimize the total deviation of all coordinate points to a fitting circle:

$$\text{Goal} = \min_{a,b}\left[(x_i - a)^2 + (y_i - b)^2 - r^2\right]$$

where Goal indicates the total minimum deviation of all coordinate points to the fitting circle, $x_i$ and $y_i$ are the two coordinate values of the target trajectory of the feature points, a and b are the two coordinate values of the center of the fitting circle, and r is the radius of the fitting circle. The nonlinear target problem is transformed into a linear problem, that is $$\text{Goal} = [-2a, -2b, 1]\begin{bmatrix} x_i \\ y_i \\ X_i + Y_i \end{bmatrix} + A + B - R$$

where $X_i = x_i^2$, $Y_i = y_i^2$, $A = a^2$, $B = b^2$, $R = r^2$, $X_i$ and $Y_i$ are the two coordinate values of the target trajectory of the transformed feature points, A and B are the two coordinate values of the center of the transformed fitting circle, and R is the radius of the transformed fitting circle. As a result, the optimization target becomes:

$$\min_{w,b}\frac{1}{2}\|w\|^2 + C\sum_{i=1}^{n}(\zeta_i + \zeta_i^*)$$

where $\zeta_i$ is a first relaxation factor, $\zeta_i^*$ indicates a second relaxation factor, C indicates a penalty factor, w indicates a target weight, $\|\ \|$ indicates the two-norm operation, n indicates the total number of relaxation factors, and i indicates the serial number of relaxation factors. Given KKT constraints, the fitting circle of the target trajectory of the feature points at the edge of the central hole is established by a Lagrange multiplier method, and the position of the center of a circle is determined.

The gray value of a circle center of the target trajectory of each feature point on the image is calculated circle by circle, and the coordinate point corresponding to the average gray value is taken as the spindle center coordinate of the spindle in the camera coordinate system. So far, the spindle center coordinates of the spindle rotating for N cycles are obtained in each of the two camera coordinate systems, and the world coordinate of the spindle center of the CNC grinding machine is constructed by fusing with the binocular calibration method.

The obtained world coordinate of the spindle center is compared with the world coordinate of the spindle center at the initial moment, and the axial and radial rotation errors of the spindle are determined according to the axial and radial separation.

In step S4, in consideration of a complicated process of the trajectory image of the feature points and a lag in the measured value of the spindle rotation error as calculation result, in the present disclosure features of the spindle rotation error of the CNC grinding machine are fused with the measured value of the spindle rotation error, and a spindle rotation error compensation model of the CNC grinding machine is established. A spindle rotation error compensation value is output by the compensation model, and the spindle rotation error of the CNC grinding machine is compensated according to the spindle rotation error compensation value. The features of the spindle rotation error of the CNC grinding machine include an axial rotation error feature and a radial rotation error feature, and the axial rotation error feature is specifically the temperature of temperature sensitive points of the CNC grinding machine, and the radial rotation error feature is specifically the change of spindle speed of the CNC grinding machine. In the specific implementation, the spindle rotation error compensation model of the CNC grinding machine is a gated recurrent unit neural network. The temperature of the temperature sensitive point and the change of spindle speed of the CNC grinding machine are both used as the input of the gated recurrent unit neural network. The measured value of the spindle rotation error is used for the calibration of the gated recurrent unit neural network for the first time. The compensation model continuously outputs the spindle rotation error compensation value, and the spindle rotation error of the CNC grinding machine is compensated according to the spindle rotation error compensation value. Specifically, the coordinate origin offset method is used to compensate the axial and radial rotation errors of the spindle of the CNC grinding machine. In specific implementation, a value equal in magnitude and opposite in direction to the compensated spindle rotation error is input into the CNC controller through the I/O interface, and the spindle rotation error of the CNC grinding machine is compensated via the origin translation function of the external mechanical coordinate system of the CNC system.

In step S5, S2-S3 are repeated, the measured value of the spindle rotation error is calculated, a current spindle rotation error compensation model of the CNC grinding machine is calibrated by using a current measured value of the spindle rotation error and the compensation model is updated, and a latest spindle rotation error compensation value is further obtained, so as to compensate the spindle rotation error of the CNC grinding machine.

In step S5, considering that it is difficult to keep the accuracy of the compensation model for a long time, according to the present disclosure, the spindle rotation error compensation value output by the spindle rotation error compensation model of the CNC grinding machine at the current time of acquiring the trajectory image is periodically calibrated according to the measured value of the spindle rotation error obtained by calculation according to each trajectory image, so as to realize parameter optimization of the compensation model to achieve the purpose of updating the compensation model, thereby improving the model accuracy.

In step S6, S5 is repeated, and the spindle rotation error compensation model of the CNC grinding machine is constantly calibrated and updated, so as to realize a continuous optimal compensation of the spindle rotation error of the CNC grinding machine.

The above-mentioned embodiments are used to explain the present disclosure, rather than limit the present disclosure. Any modification and change made to the present disclosure within the scope of protection of the spirit and claims of the present disclosure fall within the scope of protection of the present disclosure.

What is claimed is:

1. An evolutionary compensation method for a spindle rotation error of a computer numerical control CNC grinding machine based on timing in-situ measurement, comprising the following steps:

S1, fixing a spindle rotation error in-situ measuring device of the CNC grinding machine on the CNC grinding machine, determining a plurality of feature points at an edge of a central hole of a spindle, and aligning the spindle rotation error in-situ measuring device of the CNC grinding machine with the edge of the central hole of the spindle;

S2, when the CNC grinding machine is in an operating state, acquiring a trajectory image of the feature points at the edge of the central hole of the spindle by using the spindle rotation error in-situ measuring device of the CNC grinding machine;

S3, obtaining a measured value of the spindle rotation error by calculation according to the trajectory image of the feature points at the edge of the central hole of the spindle;

S4, fusing features of the spindle rotation error of the CNC grinding machine with the measured value of the spindle rotation error; establishing a spindle rotation error compensation model of the CNC grinding machine, by which a spindle rotation error compensation value is output; and compensating the spindle rotation error of the CNC grinding machine according to the spindle rotation error compensation value;

S5, repeating S2-S3, obtaining the measured value of the spindle rotation error by calculation, calibrating the spindle rotation error compensation model of the CNC grinding machine at current time by using a current measured value of the spindle rotation error and updating the spindle rotation error compensation model, and obtaining a latest spindle rotation error compensation value;

S6: repeating S5, and constantly calibrating and updating the spindle rotation error compensation model of the CNC grinding machine, so as to realize continuous optimization and compensation of the spindle rotation error of the CNC grinding machine.

2. The evolutionary compensation method according to claim 1, wherein in S1, sizes of the feature points are set to 5 μm to 20 μm.

3. The evolutionary compensation method according to claim 1, wherein in S2, camera shutter time of the spindle rotation error in-situ measuring device of the CNC grinding machine is same as a spindle rotation period, trajectories of the feature points at the edge of the central hole of the spindle rotating with the spindle for N cycles is acquired every m minutes to obtain an initial feature point image, and a trajectory image of the feature points at the edge of the central hole of the spindle is obtained after image enhancement and edge extraction of the initial feature point image.

4. The evolutionary compensation method according to claim 1, wherein S3 specifically comprises:

according to trajectory images of the feature points at the edge of the central hole of the spindle acquired by a right industrial camera (9) and a left industrial camera (12) respectively, determining spindle center coordinates of the spindle in camera coordinate systems corresponding to the right industrial camera (9) and the left industrial camera (12) respectively, fusing and analyzing the spindle center coordinates of the spindle in the two camera coordinate systems by using a binocular calibration method to obtain a world coordinate of a spindle center of the CNC grinding machine, determining an axial rotation error and a radial rotation error of the spindle according to the world coordinate of the spindle center of the CNC grinding machine, and denoting the axial rotation error and the radial rotation error as the measured value of the spindle rotation error.

5. The evolutionary compensation method according to claim 1, wherein in S4, the features of the spindle rotation error of the CNC grinding machine comprise an axial rotation error feature and a radial rotation error feature, the axial rotation error feature is a temperature of a temperature sensitive point of the CNC grinding machine, and the radial rotation error feature is a change of spindle speed of the CNC grinding machine.

6. The evolutionary compensation method according to claim 1, wherein in S5, the spindle rotation error compensation value output by the spindle rotation error compensation model of the CNC grinding machine at the current time of acquiring the trajectory image is calibrated according to the measured value of the spindle rotation error obtained by calculation according to each trajectory image, so as to realize parameter optimization of the compensation model to update the compensation model.

7. The evolutionary compensation method according to claim 1, wherein in S1, the spindle rotation error in-situ measuring device of the CNC grinding machine comprises a vertical guide rail frame (1), a horizontal guide rail (2), front and rear guide rails (4), a sliding table (5), a pitching guide rail (6), a calibration light source (7), a left camera assembly and a right camera assembly;

the vertical guide rail frame (1) is fixedly installed in the CNC grinding machine, the horizontal guide rail (2) is installed in the vertical guide rail frame (1), the horizontal guide rail (2) slides up and down in the vertical guide rail frame (1); the front and rear guide rails (4) are installed on the horizontal guide rail (2), and the front and rear guide rails (4) slide horizontally in the horizontal guide rail (2); the sliding table (5) is installed on the front and rear guide rails (4), and the sliding table (5) slides forward and backward in the front and rear guide rails (4); the calibration light source (7) is fixedly installed on a side surface of the sliding table (5), the pitching guide rail (6) is installed on the sliding table (5), and the left camera assembly and the right camera assembly are installed in the pitching guide rail (6).

8. The evolutionary compensation method according to claim 1, wherein the calibration light source (7) comprises a rotary aperture adjusting ring (71), a silicon-based target slice (72), a support (73) and an LED light source (74);

the support (73) is fixedly installed on the LED light source (74), the rotary aperture adjusting ring (71) is installed on the support (73), the silicon-based target slice (72) is installed between the rotary aperture adjusting ring (71) and the support (73), the middle of the support (73) is provided with a through hole, the middle of the silicon-based target slice (72) is provided with a light-transmitting ring hole, a light beam emitted by the LED light source (74) passes through the through hole of the support (73) and the light-transmitting ring hole in sequence and exits from the rotary aperture adjusting ring (71).

* * * * *